United States Patent [19]
Shimose

[11] Patent Number: 5,186,494
[45] Date of Patent: Feb. 16, 1993

[54] PASSENGER RESTRAINT SYSTEM FOR USE IN AUTOMOTIVE VEHICLE

[75] Inventor: Yoshifumi Shimose, Kanagawa, Japan

[73] Assignee: Nissan Motor Co., Ltd., Yokohama, Japan

[21] Appl. No.: 728,473

[22] Filed: Jul. 11, 1991

[30] Foreign Application Priority Data

Jul. 11, 1990 [JP] Japan .................................. 2-182907

[51] Int. Cl.⁵ .............................................. B60R 22/36
[52] U.S. Cl. .................................... 280/806; 100/268; 100/282
[58] Field of Search ............... 280/727, 801, 806, 748, 280/753; 180/268, 282

[56] References Cited

U.S. PATENT DOCUMENTS

| | | | |
|---|---|---|---|
| 3,858,930 | 1/1975 | Calandra et al. | 280/748 |
| 3,899,042 | 8/1975 | Bonar | 280/753 |
| 4,722,550 | 2/1988 | Imaoka et al. | 180/282 |
| 4,884,652 | 12/1989 | Vollmer | 280/806 |

FOREIGN PATENT DOCUMENTS

57-136413 8/1982 Japan .

Primary Examiner—Kenneth R. Rice
Attorney, Agent, or Firm—Pennie & Edmonds

[57] ABSTRACT

A passenger restraint system for use in an automotive vehicle comprises a collision detecting sensor for detecting a collision of the vehicle, a retractor with a preloader for providing a tension to a seat belt in response to a signal from the collision detecting sensor, and an air bag device. The air bag device includes a bag which is broken in response to the signal from the collision detecting sensor, thus forming a clearance between a passenger and a seat back.

7 Claims, 12 Drawing Sheets

PASSENGER RESTRAINT SYSTEM FOR USE IN AUTOMOTIVE VEHICLE

BACKGROUND OF THE INVENTION

The present invention relates to a passenger restraint system for use in an automotive vehicle.

Figure 20:
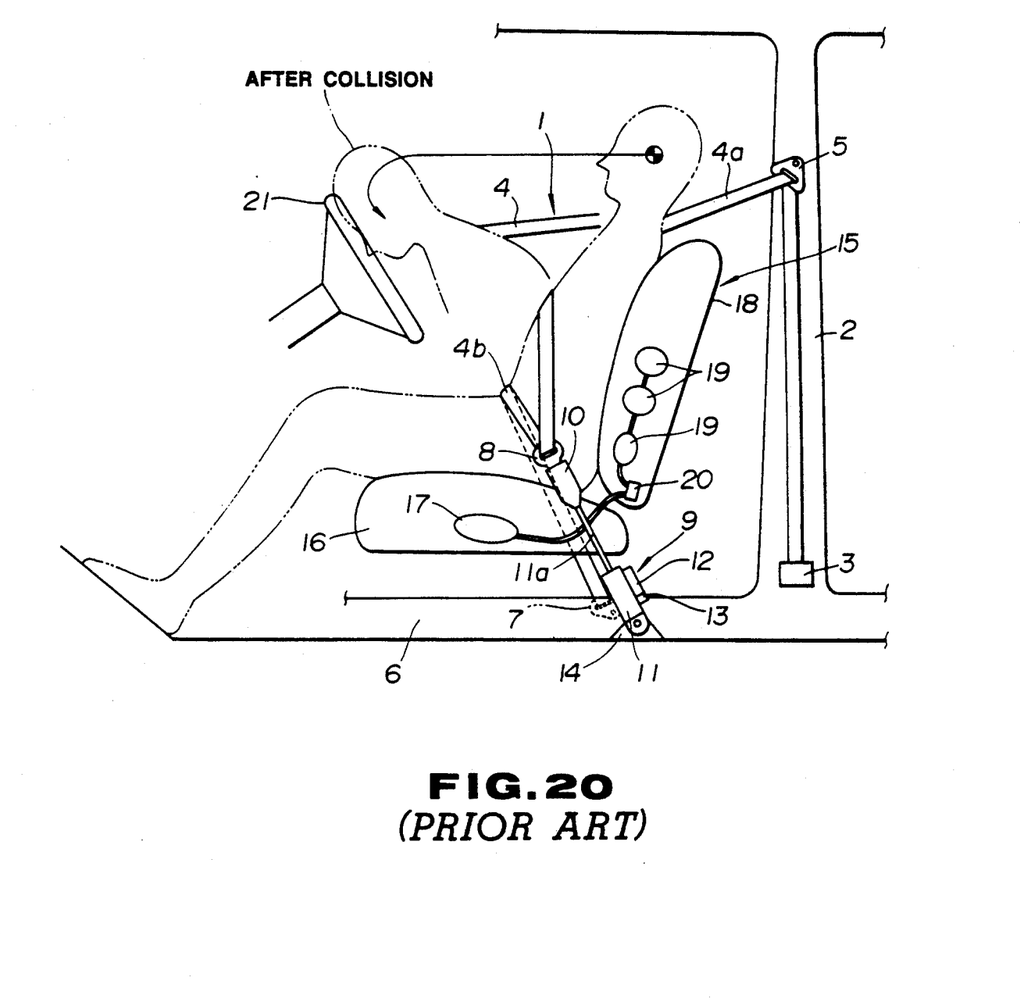
FIG. 20 is a view similar to FIG. 13, illustrating a known passenger restraint system.

Referring to FIG. 20, there is shown an example of known passenger restraint systems for use in an automotive vehicle. In FIG. 20, a seat belt device is designated by a reference numeral 1, and includes a seat belt 4 which is wound to a retractor 3 arranged in a center pillar 2. The seat belt 4 as drawn from the retractor 3 passes through a through anchor 5 mounted to the center pillar 2 at the upper portion thereof, and it is connected to an anchor plate 7 mounted to a side sill 6.

Additionally, the seat belt 5 passes through a through ring 8 having a tang for dividing the seat belt 4 into a shoulder belt 4a, and a lap belt 4b. The through ring 8 is engaged with a buckle 10 supported by a preloader device 9.

The preloader device 9 includes a cylinder 11 mounted to a floor panel 14, an inflator 12, and an igniter 13. when the igniter 13 receives a signal, the inflator 12 explodes to introduce gas into the cylinder 11, causing instant retraction of one end of a cylinder rod 11a therein. This results in traction of the buckle 10 engaged with the other end of the cylinder rod 11a, viz., traction of the seat belt 4, thus achieving a passenger restraint.

A seat 15 is of the air lumbar support type, and includes a seat cushion 16, and a seat back 18. An air feeder 17 is arranged within the seat cushion 16, whereas a plurality of bags 19 are arranged within the seat back 18. The air feeder 17 and the plurality of bags 19 are fluidly connected through a suction and discharge valve 20 which serves to adjust an amount of air of the air feeder 17 to be provided to the bags 19 so as to obtain an optimum support of a passenger's lumbar. The art of this kind is disclosed, for example, in JP-A 57-136413 published on Aug. 23, 1982.

With the above-described known passenger restraint system however, upon a frontal collision of the vehicle, since the seat belt 4 functions to restrain the passenger's lumbar by operation of the preloader device 9 while a passenger is urged to move forward by inertia, a seating position of the passenger should be established as rearward as possible to prevent a passenger's head when thrown forward from stricking a steering wheel 21, resulting in an increase in distance between the steering wheel 21 and the passenger.

To accomplish this increased distance, the entirety of the seat 15 may be moved backward upon frontal collision of the vehicle. However that event, a greater force is needed to draw the seat 15 backward due to the passenger seated thereon, and a foot space is decreased with regard to a passenger(s) seated on a rear seat.

It is, therefore, an object of the present invention to provide a passenger restraint system for use in an automotive vehicle which ensures an appropriate driving position to a passenger or driver.

SUMMARY OF THE INVENTION

According to one aspect of the present invention, there is provided a restraint system for a passenger in an automotive vehicle, the restraint system having a seat belt, comprising:

means for detecting a collision of the automotive vehicle and generating a signal when said collision of the automotive vehicle is detected;
means for providing a tension to the seat belt in response to said signal; and
means for allowing movement of the passenger in a direction opposite to a driving direction of the automotive vehicle in response to said signal.

According to another aspect of the present invention, there is provided, in an automotive vehicle having a passenger:
a seat;
a seat belt secured to said seat;
means for detecting a collision of the automotive vehicle and generating a signal when said collision of the automotive vehicle is detected;
means for providing a tension to said seat belt in response to said signal; and
means for allowing movement of the passenger in a direction opposite to a driving direction of the automotive vehicle in response to said signal.

DETAILED DESCRIPTION OF THE INVENTION

Referring to FIGS. 1 to 19, in a manner similar to the prior art as described in connection with FIG. 20, a seat belt device is designated by a reference numeral 1, and includes a seat belt 4 which is wound to a retractor 3 arranged in a center pillar 2. The seat belt 4 as drawn from the retractor 3 passes through a through-anchor 5 mounted to the center pillar 2 at the upper portion thereof, and it is connected to an anchor plate 7 mounted to a side sill 6. Additionally, the seat belt 5 passes through a through-ring 8 having a tang for dividing the seat belt 4 into a shoulder belt 4a, and a lap belt 4b. The through-ring 8 is engaged with a buckle 10 supported by a preloader device 9. The preloader device 9 which serves as traction means includes a cylinder 11 mounted to a floor panel 14, an inflator 12, and an igniter 13. When the igniter 13 receives a signal, the inflator 12 explodes to introduce gas into the cylinder 11, causing instant retraction of one end of a cylinder rod 11a in the cylinder 11. This results in traction of the buckle 10 engaged with the other end of the cylinder rod 11a, viz., traction of the seat belt 4, thus achieving a passenger restraint.

Referring to FIGS. 1 to 14, a first preferred embodiment of the present invention will be described.

Figures 3, 5:
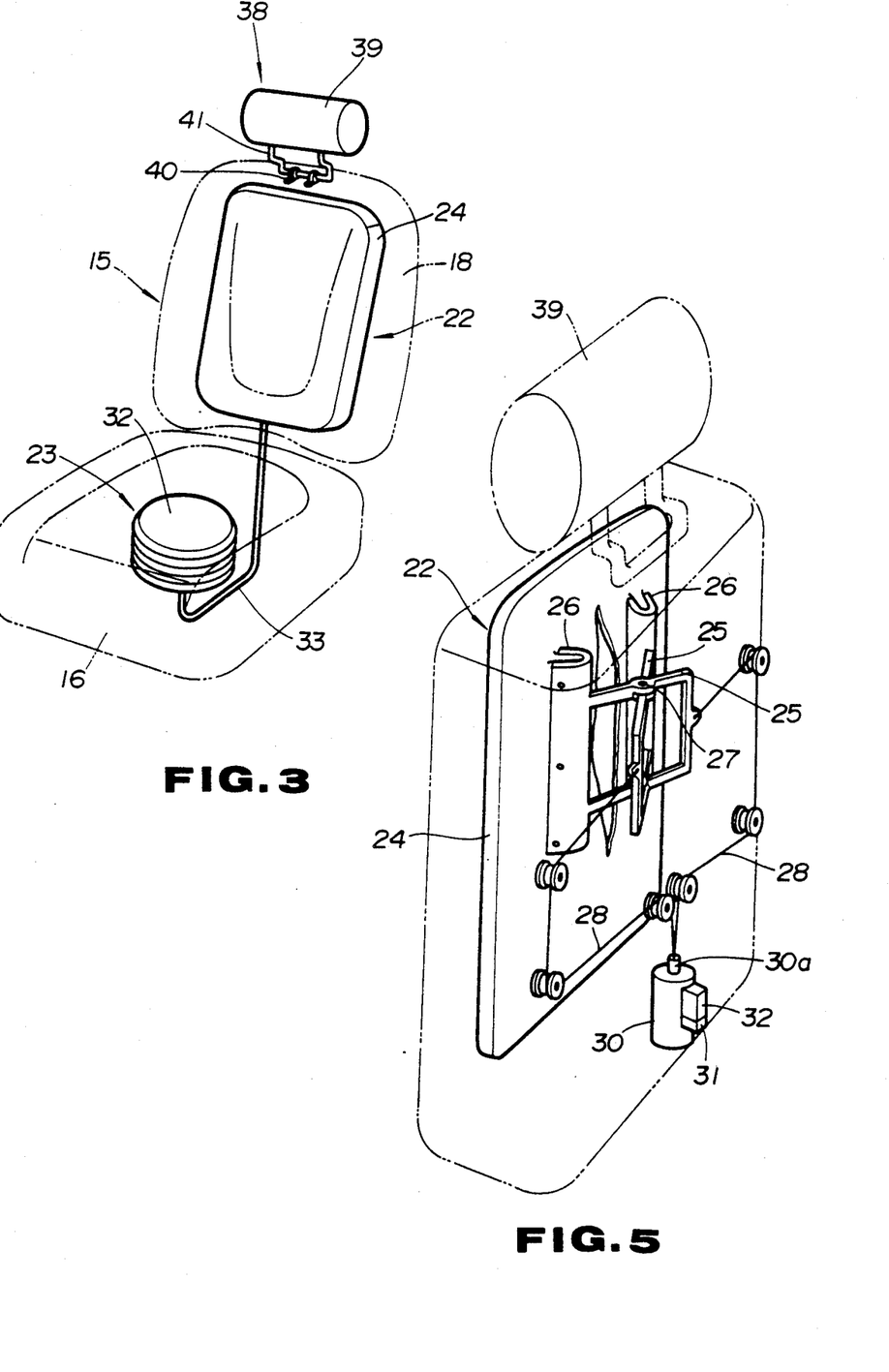
FIG. 3 is a perspective view illustrating a seat.
FIG. 5 is a view similar to FIG. 4, illustrating the air bag device in an operating condition.

The seat 15 includes a seat cushion 16, and a seat back 18. An air feeder 23 is arranged within the seat cushion 16, whereas an air bag device 22 which serves as movement allowing means is arranged within the seat back 18.

Figure 4:
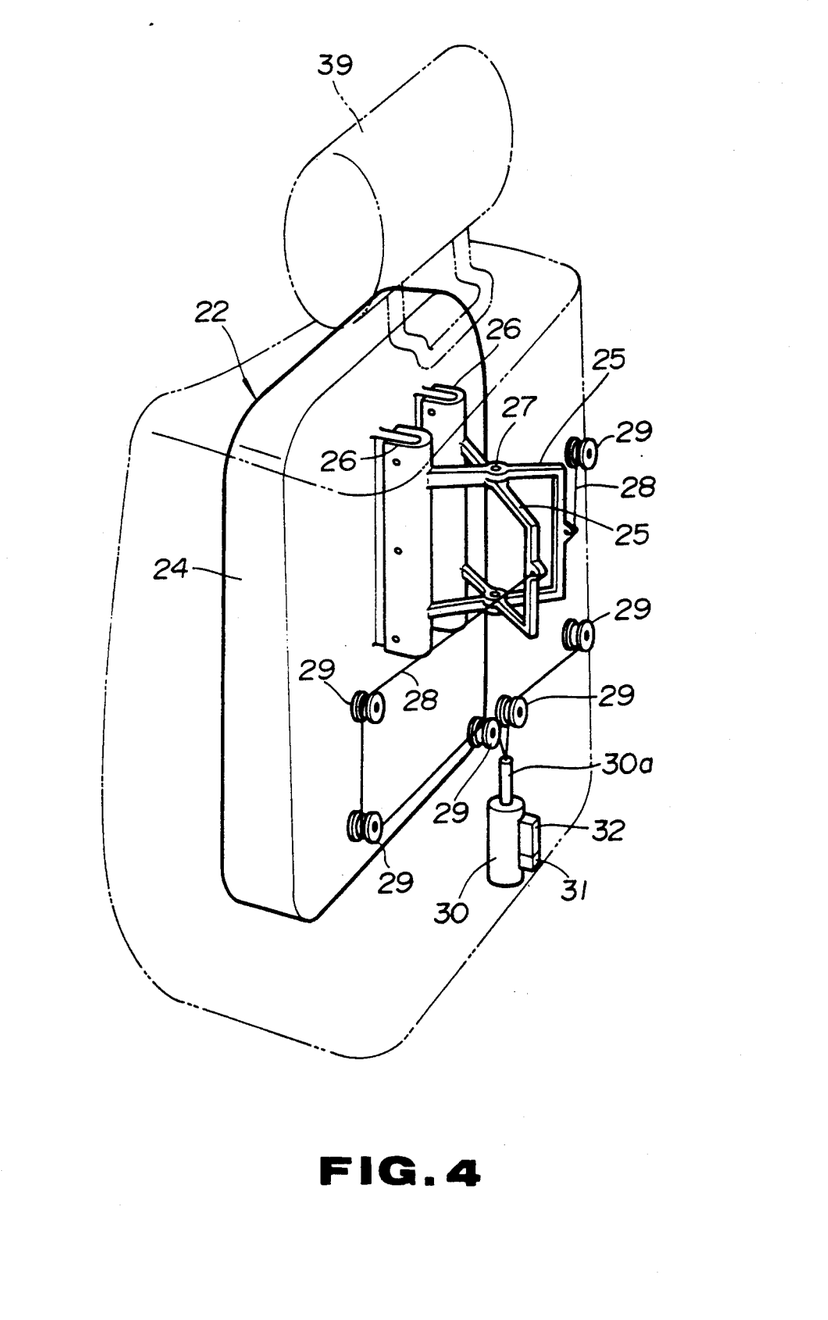
FIG. 4 is a view similar to FIG. 3, illustrating an air bag device.

Referring to FIGS. 4 and 5, a bag 24 of the air filling type is disposed within the air bag device 22, has the back supported by a pair of links 25.

The links 25 form a rectangle, and have one side having two supporting portions 26 for supporting the bag 24. Each link 25 is rotatably supported at a supporting point 27 arranged at the center of two sides of the rectangle adjacent to the supporting portions 26.

A pair of wires 28 are arranged to interconnect a side of the rectangle opposite to the supporting portions 26 of the links 25 and a cylinder rod 30a of a cylinder 30 through rollers 29 which serve as a guide. The cylinder 30 includes an inflator 32 with an igniter 31.

When the igniter 31 receives a signal, the inflator 32 explodes to produce gas, causing retraction of the cylinder rod 30a in the cylinder 30. As a result, the wires 28 are drawn to rotate the links 25 on the supporting point, urging to move the supporting portions 26 outward so as to break the bag 24 as shown in FIG. 5.

Figure 6:
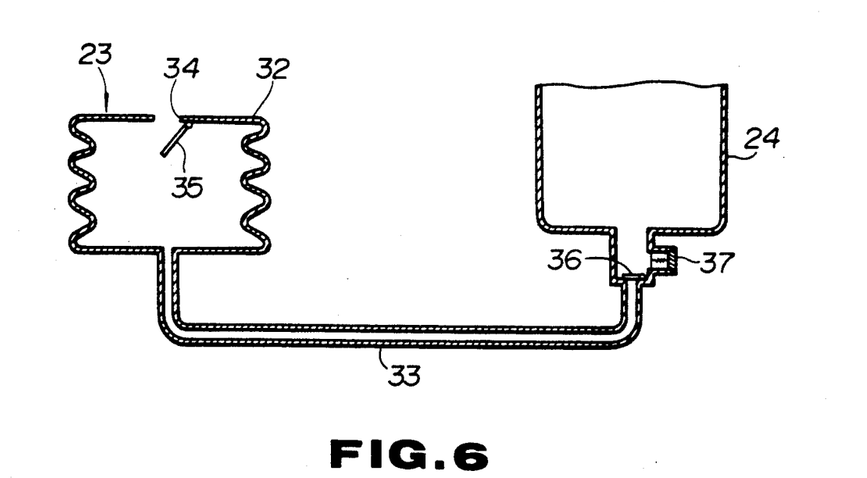
FIG. 6 is a schematic view illustrating an air feeder and a bag.
Figure 7:
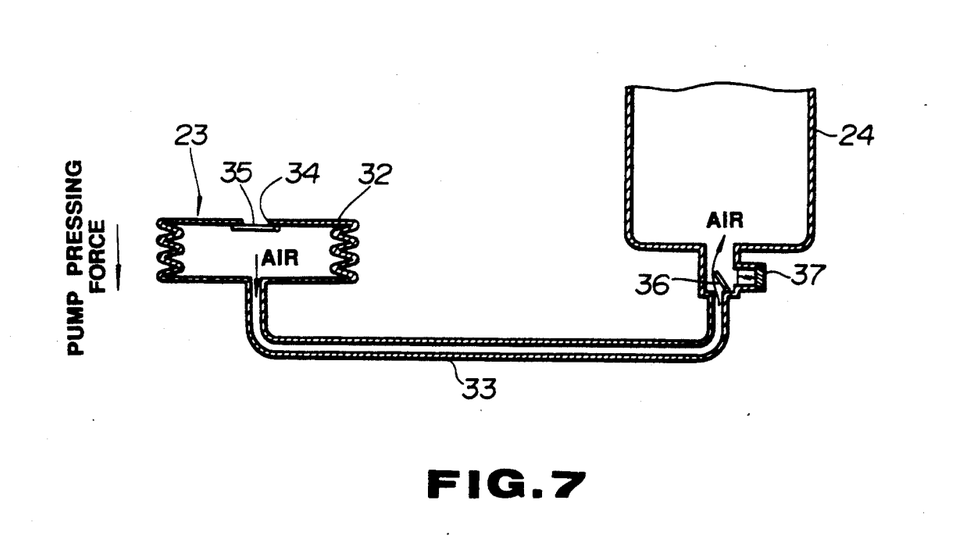
FIG. 7 is a view similar to FIG. 6, showing the air feeder with a pump loaded.
Figure 8:
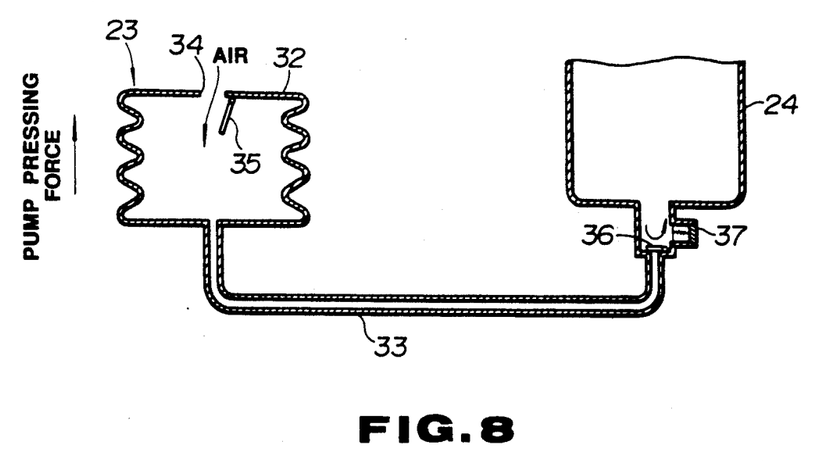
FIG. 8 is a view similar to FIG. 7, showing the air feeder with the pump unloaded.

Referring to FIGS. 6 to 9, the air feeder 23 includes a pump 32 arranged within the seat cushion 16, and a tube 33 fluidly connecting the pump 32 and the bag 24. The pump 32 assumes the form of bellows, and is provided with a valve 35 at the intake 34 thereof. When loading the pump 32, the valve 35 closes to provide air to the bag 24 as shown in FIG. 7, whereas when unloading the pump 32, the valve 35 opens to supply air out of the intake 34, thus restoring the pump 32 as shown in FIG. 8.

Figure 9:
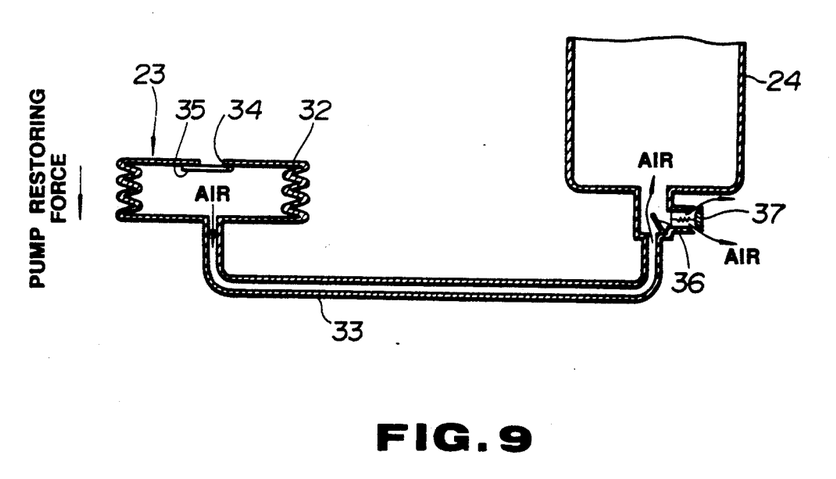
FIG. 9 is a view similar to FIG. 8, showing the bag with a valve opened.

On the other hand, the tube 33 is provided with a valve 36 at the bag side end thereof. Upon air supply, the valve 36 opens to prevent an outflow of air from the bag 24 as shown in FIG. 9.

A relief valve is designated by a reference numeral 37, and it opens when the internal pressure of the bag 24 exceeds a predetermined so as to release air within the bag 24 into the atmosphere.

Figure 10:
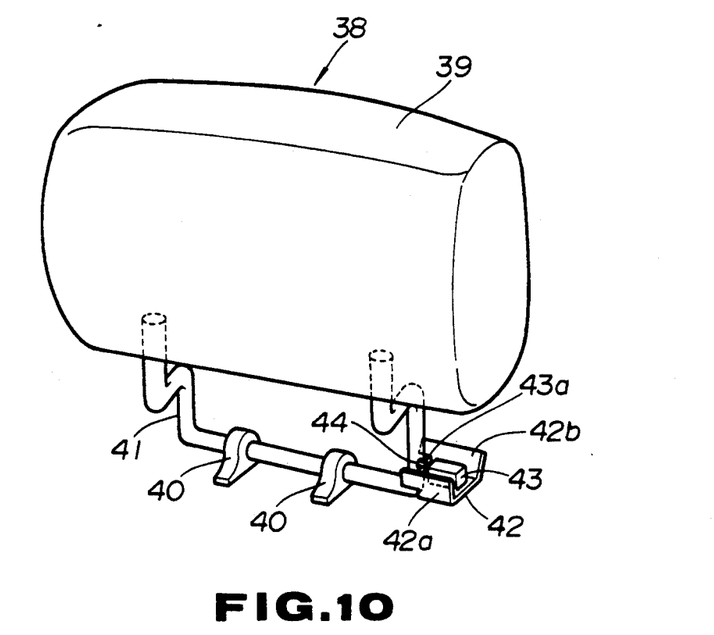
FIG. 10 is a view similar to FIG. 5, illustrating a head rest rotating device.
Figure 11:
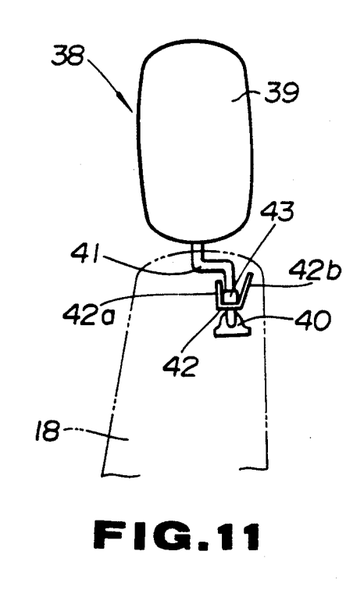
FIG. 11 is a side view illustrating the head rest rotating device.
Figure 12:
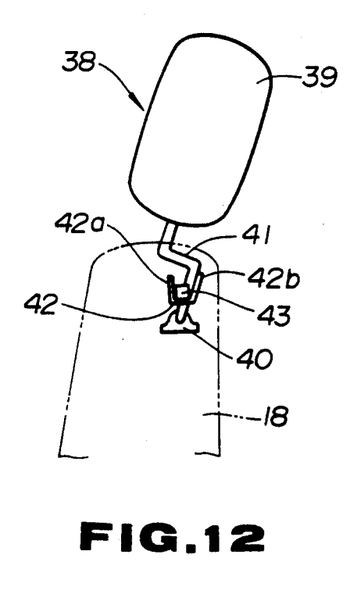
FIG. 12 is a view similar to FIG. 11, showing the head rest rotating device in an operating condition.

Referring to FIGS. 10 to 12, there is shown a head rest 39 having a rotating device 38 thereof.

The head rest 39 includes a stay 41 which is rotatably supported on a support 40 mounted to the seat back 18. A plate 42 having an U-shaped cross section is also mounted thereto. A solenoid 43 is installed to the plate 42, and includes a stopper pin 43a insertedly mounted to a groove 44 of the stay 41 for regulating rotation of the head rest 39.

When the solenoid 43 receives a signal, the stopper pin 43a is disengaged from the groove 44 so as to allow rotation of the head rest 39 as shown in FIG. 12.

The plate 42 has front and rear side walls 42a and 42b which function as a stopper so that rotation of the stay 41 and the head rest 39 fail to exceed a predetermined angle, respectively.

The retractor 3 of the seat belt device 1 is of the type having a preloader.

Figure 13:
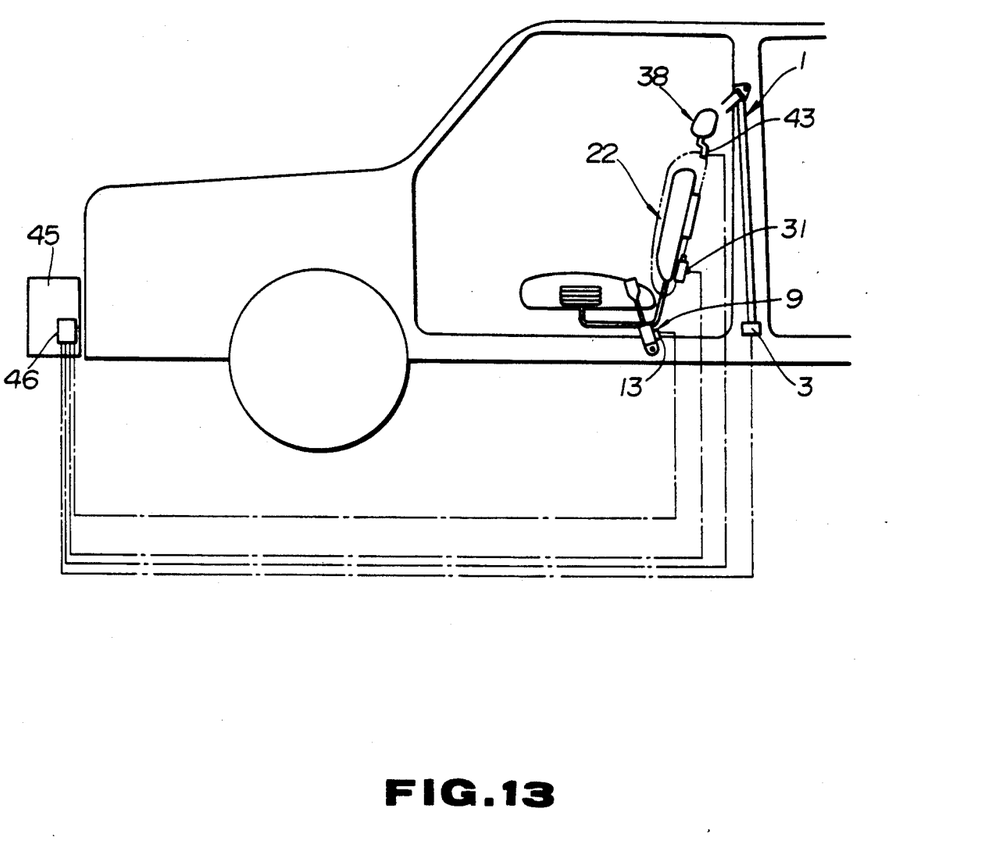
FIG. 13 is a view similar to FIG. 2, illustrating an electrical connection of the passenger restraint system.

Referring to FIG. 13, a collision detecting sensor 46 which serves as collision detecting means is arranged within a bumper 45 disposed to the front of a vehicle body. When detecting a collision, the collision detecting sensor 46 outputs a signal to the retractor 3 with a preloader of the seat belt device 1, the igniter 31 of the air bag device 22, the igniter 13 of the preloader device 9, and the solenoid 43 of the head rest rotating device 38.

Next, the operation of the first preferred embodiment will be described.

Referring to FIG. 13, when a vehicle has a frontal collision, the collision detecting sensor 46 within the bumper 45 detects this collision, and outputs a signal to the retractor 3 with a preloader of the seat belt device 1, the igniter 31 of the air bag device 22, the igniter 13 of the preloader device 9, and the solenoid 43 of the head rest rotating device 38.

Referring to FIG. 5, in the air bag device 22, the inflator 32 explodes to introduce gas into the cylinder 30, causing instant retraction of the cylinder rod 30a therein, thus drawing downward the wires 28 each having one end connected to the cylinder rod 30a. Then, the links 25 as connected to the other end of each wire 28 are opened outward as viewed from a cross direction of the vehicle, breaking the bag 24 by opposite movement of the supporting portions 26. Air within the bag 24 is released to contract the bag 24, resulting in the seat back 18 being thinned. Thus, a clearance is formed between the passenger and the seat back 18.

Figure 1:
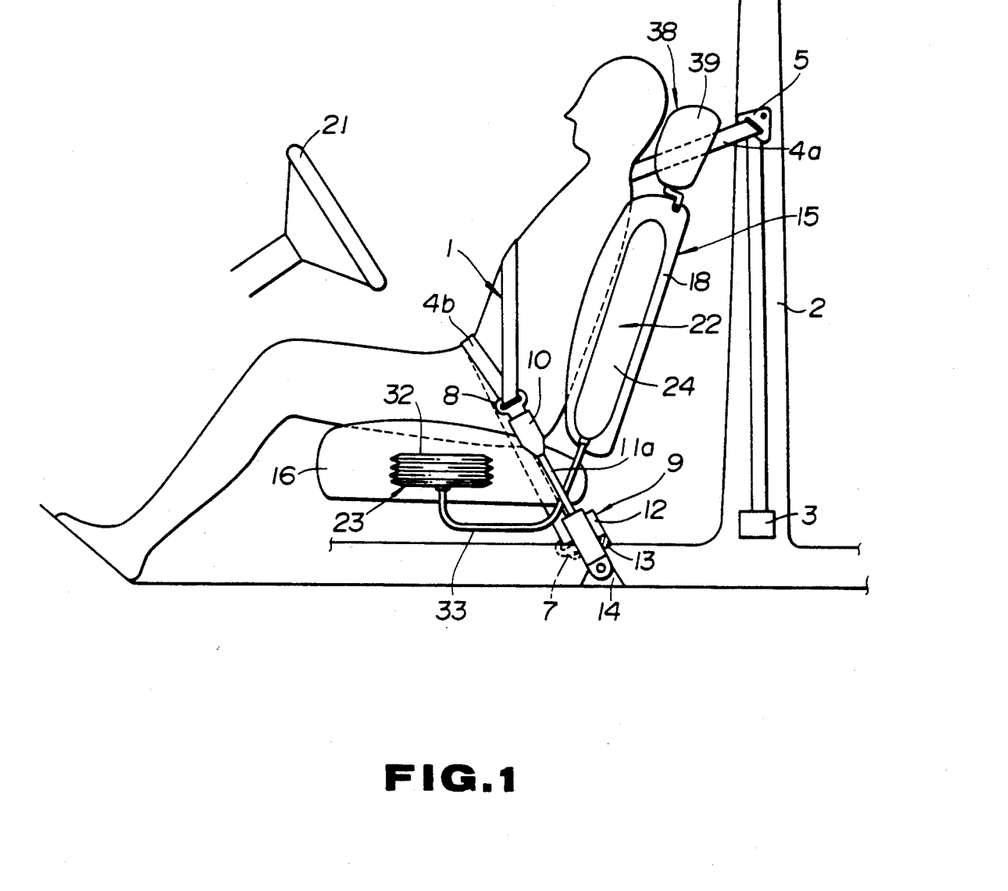
FIG. 1 is a diagrammatic view illustrating a first preferred embodiment of the present invention, with a passenger and a steering wheel.
Figure 2:
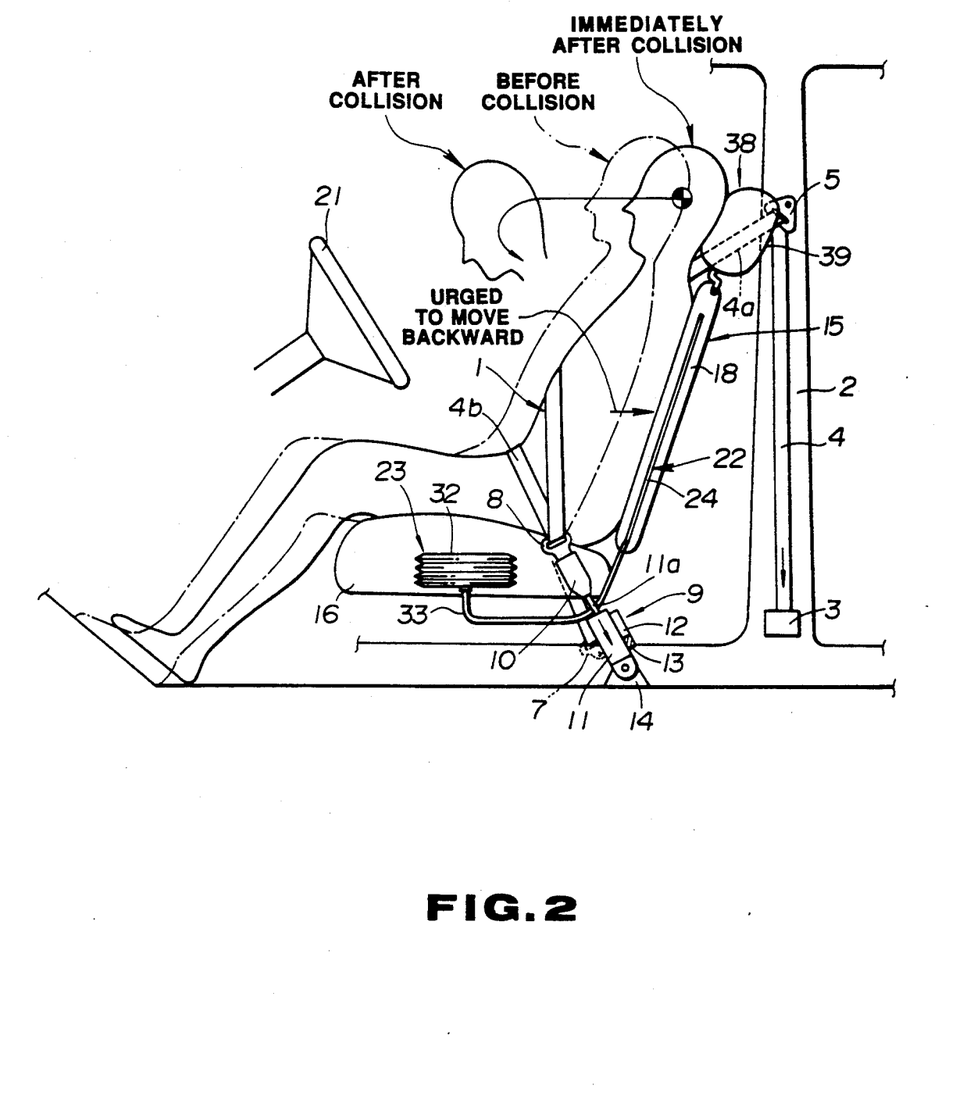
FIG. 2 is a view similar to FIG. 1, illustrating the passenger restraint system in an operating condition.

Referring to FIG. 2, the inflator 12 of the preloader device 9 explodes at the same time to introduce gas into the cylinder 11, retracting the cylinder rod 11a therein, thus drawing a shoulder belt 4a and a lap belt 4b downward.

When receiving a signal from the collision detecting sensor 46, the retractor 3 with a preloader of the seat belt device 1 winds up the seat belt 4. Accordingly, due to tension of the shoulder belt 4a and the lap belt 4b generated by the preloader device 9 and the retractor 3 with a preloader, the passenger is urged to move backward by the clearance between the passenger and the seat back 18 which results from contraction of the bag 24. A distance between the passenger and the steering wheel 21 is lengthened by this backward movement.

Figure 14:
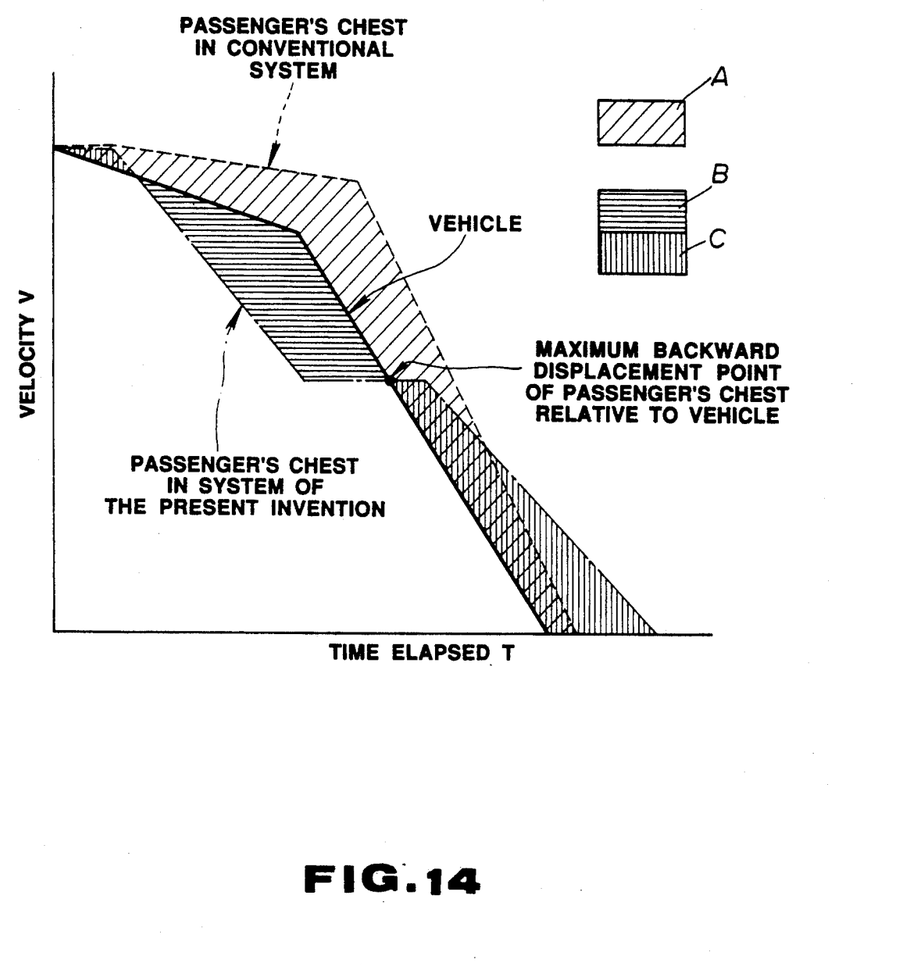
FIG. 14 is a graphical representation showing a time alteration of a vehicle speed, a passenger's chest speed in the present restraint system, and same in a known restraint system.

Referring to FIG. 14, there is shown a time alteration of a vehicle speed, a passenger's chest speed in the present restraint system, and same in a known restraint system.

A portion with lines A indicates an amount of forward movement of the passenger's chest relative to the vehicle in the known restraint system. On the other hand, a portion with lines B indicates an amount of backward movement of the passenger's chest relative to the vehicle in the present restraint system. A portion with lines C indicates an amount of forward movement of the passenger's chest relative to the vehicle in the present restraint system.

Specifically, in the present passenger restraint system, the amount of forward movement of the passenger's chest relative to the vehicle is indicated by (portion with lines C-portion with lines B), which shows an obvious decrease as compared with the amount same A in the known passenger restraint system. Since the amount of forward movement of the passenger's chest decreases, forward movement of the passenger's head also decreases, thus thereby preventing the passenger from striking the steering wheel 21.

As soon as the seat belt device 1 and the air bag device 22 operate in that manner, the solenoid 43 of the head rest rotating device 38 receives a signal out of the collision detecting sensor 46. As a result, the stopper pin 43a of the solenoid 43 is withdrawn to allow the head rest 39 to rotate by a predetermined angle. Thus, if the passenger's head interferes with the head rest 39 when the passenger is urged to move rearward, the head rest 39 rotates backward to minimize an impact on the head, and allow rearward movement thereof.

In consideration of air leakage of the air bag 24 during a long lapse of time, the bag 24 is always filled with air by the air feeder 23.

Specifically, when the passenger takes a seat, the pump 32 within the seat cushion 32 is pressed downward as shown in FIG. 7, providing air within the pump 32 to the bag 24 through the tube 33. If the bag 24 is already filled with air, the relief valve 37 discharges air due to increased internal pressure of the bag 24.

Figure 15:
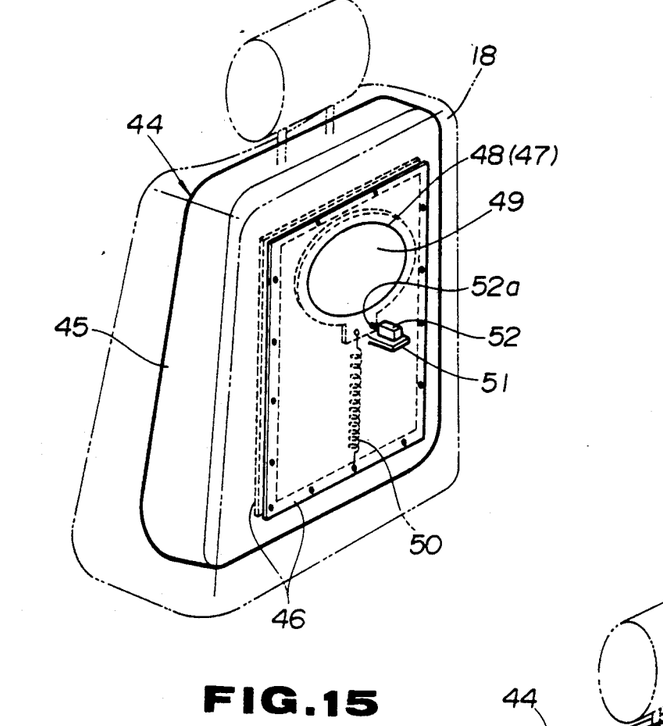
FIG. 15 is a view similar to FIG. 10, illustrating an air bag device in a second preferred embodiment of the present invention.
Figure 16:
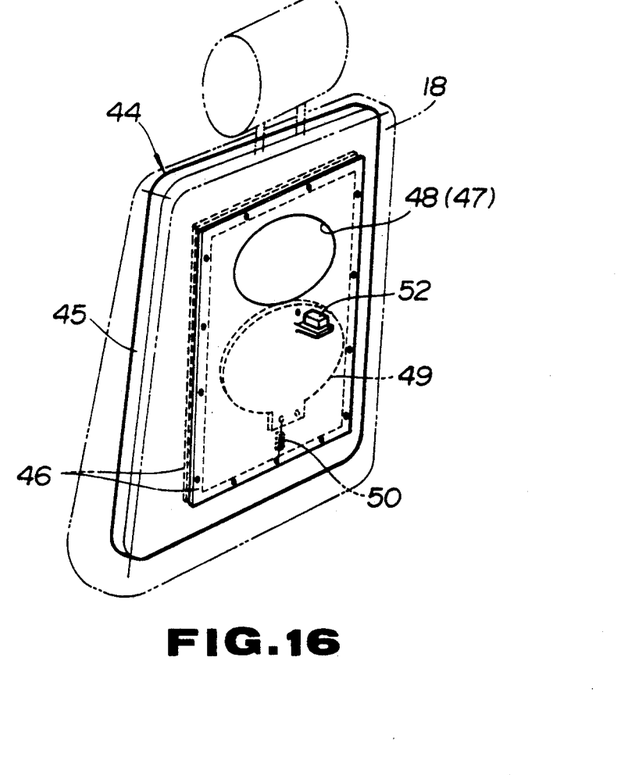
FIG. 16 is a view similar to FIG. 15, showing the air bag device in an operating condition.

Referring to FIGS. 15 and 16, a second preferred embodiment of the present invention will be described.

The architecture of the second preferred embodiment is substantially the same as that of the first preferred embodiment except for a different air bag device.

Referring to FIGS. 15 and 16, an air bag device 44 includes a pair of plates 46 arranged to the back face of a bag 45 so as to hold a material thereof. Each plate 46 has a large hole 48 corresponding to a hole 47 of the bag 45 and located at the upper portion of the seat back 18. A plate valve 49 is disposed between the plates 46 so as to close the hole 48, and it is biased downward by a spring 50.

Mounted to the outer plate 46 is a support 51 to which a solenoid 52 is secured. The solenoid 52 has a stopper pin 52a which is insertedly mounted to the plate valve 49 and the plates 46, holding the plate valve 49 closed. Additionally, the solenoid 52 is connected to the collision detecting sensor 46.

When a solenoid 52 receives a signal from the collision detecting sensor 46 upon frontal collision of the vehicle, the stopper pin 52a of the solenoid 52 is withdrawn to remove the plate valve 49 from a close position. As a result, the plate valve 49 is drawn downward by the spring 50 to release air within the bag 45 in the atmosphere through the hole 47 of the bag 45 and the hole 48 of each plate 46, forming the clearance between the passenger and the seat back 18.

Figure 17:
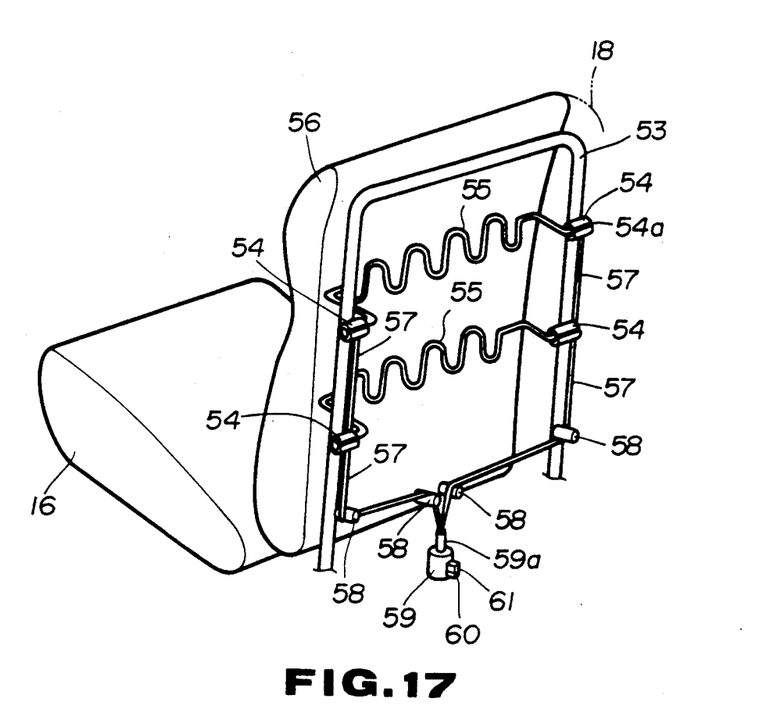
FIG. 17 is a view similar to FIG. 16, illustrating a seat with mechanical type movement allowing means in a third preferred embodiment of the present invention.
Figure 18:
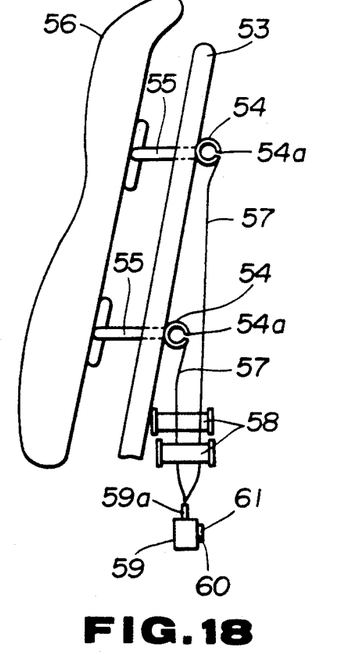
FIG. 18 is a view similar to FIG. 12, showing a seat back cushion with the movement allowing means.
Figure 19:
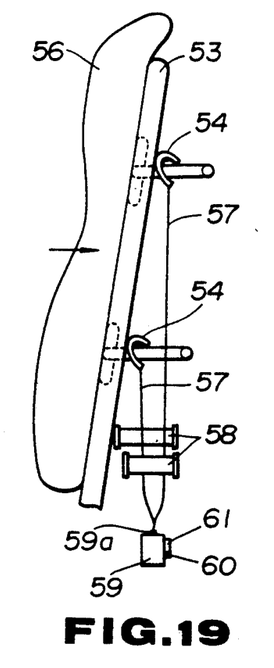
FIG. 19 is a view similar to FIG. 18, showing the movement allowing means in an operating condition.

Referring to FIGS. 17 to 19, a third preferred embodiment of the present invention will be described.

In the third preferred embodiment, the movement allowing means are of the mechanical type, and not of the air bag type.

A frame 53 is arranged within the seat bag 18, and includes four tubular supports 54.

An S-spring 55 is disposed between the two tubular supports 55 as viewed from the cross direction of the vehicle, and has both ends insertedly mounted thereto. A seat back cushion 56 is supported by the S-springs 55.

Each tubular support 54 has a split 54a at the outer periphery thereof which opens when undergoing a predetermined load, resulting in disengagement of the S-spring 55.

A pair of wires 57 are arranged to interconnect the tubular supports 54 and a cylinder rod 59a of a cylinder 59 through two rollers 58 which are rotatably mounted to the frame 53. An igniter 60 and an inflator 61 are mounted to the cylinder 59.

When the igniter 60 receives a signal from the collision detecting sensor 46, the inflator 61 explodes to introduce gas into the cylinder 59, causing instant retraction of the cylinder rod 59a therein. As a result, the wires 57 are drawn to load the tubular supports 54, opening the splits 54a thereof, obtaining disengagement of the S-springs 55. Thus, the seat back cushion 56 is urged to move rearward in accordance with rearward movement of the passenger without any obstruction.

In that manner, in the second and third preferred embodiments, also, backward movement of the passenger is possible upon frontal collision of the vehicle, preventing interference of the passenger with the steering wheel 21.

What is claimed is:

1. A restraint system for a passenger in an automobile vehicle comprising:

a seat including a seat cushion and a seat back:

a seat belt arranged to restrain a passenger to said seat;

means for detecting a collision of the automotive vehicle and generating a signal when said collision of the automotive vehicle is detected;

means for providing a tension to said seat belt in response to said signal;

means for allowing movement of the passenger in a direction opposite to a driving direction of the automotive vehicle in response to said signal said movement allowing means being arranged to said seat back; and means for driving substantially synchronously said tension providing means and said movement allowing means.

2. A restraint system for a passenger in an automotive vehicle, the restraint system, comprising:

a seat belt;

means for detecting a collision of the automotive vehicle and generating a signal when said collision of the automotive vehicle is detected;

means for providing a tension to said seat belt in response to said signal; and means for allowing movement of the passenger in a direction opposite to a driving direction of the automotive vehicle in response to said signal, said movement allowing means including a bag of the air filling type, and means for releasing air within said bag.

3. A restraint system as claimed in claim 2, wherein said air releasing means include a pair of links with two supporting portions, a cylinder, an igniter, and an inflator.

4. A restraint system as claimed in claim 3, wherein said air releasing means include a pair of plates each having a hole corresponding to a hole of said bag, a solenoid with a stopper pin, and a plate valve.

5. A restraint system as claimed in claim 2, wherein said movement allowing means include a frame with four tubular supports, a pair of S-springs, a cylinder, an igniter, and an inflator.

6. A restraint system as claimed in claim 2, wherein said collision detecting means include a collision detecting sensor.

7. A restraint system as claimed in claim 2, wherein said tension providing means include a preloader device.

* * * * *